(12) United States Patent
Ueyama

(10) Patent No.: US 7,891,858 B2
(45) Date of Patent: Feb. 22, 2011

(54) DISPLAY

(75) Inventor: Munetoshi Ueyama, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 516 days.

(21) Appl. No.: 11/916,395

(22) PCT Filed: Apr. 25, 2006

(86) PCT No.: PCT/JP2006/308635

§ 371 (c)(1),
(2), (4) Date: Dec. 3, 2007

(87) PCT Pub. No.: WO2006/132039

PCT Pub. Date: Dec. 14, 2006

(65) Prior Publication Data

US 2010/0195351 A1 Aug. 5, 2010

(30) Foreign Application Priority Data

Jun. 9, 2005 (JP) .............................. 2005-168967

(51) Int. Cl.
*F21V 7/04* (2006.01)
(52) U.S. Cl. .................. 362/631; 362/97.2; 362/612; 362/613
(58) Field of Classification Search .............. 362/97.2, 362/97.3, 228, 229, 240, 241, 246, 602, 612, 362/613, 630, 631; 349/58, 65
See application file for complete search history.

(56) References Cited

U.S. PATENT DOCUMENTS 6,697,130 B2 * 2/2004 Weindorf et al. ............. 349/65

| | | | |
|---|---|---|---|
| 2005/0088830 A1 | 4/2005 | Yumoto et al. | |
| 2006/0221612 A1* | 10/2006 | Song et al. | 362/241 |
| 2007/0253218 A1* | 11/2007 | Tanabe | 362/612 |
| 2009/0237592 A1* | 9/2009 | Mizutani | 349/65 |
| 2009/0279020 A1* | 11/2009 | Tanabe | 349/65 |

FOREIGN PATENT DOCUMENTS

| JP | 08-166588 A | 6/1996 |
|---|---|---|
| JP | 08-248420 A | 9/1996 |
| JP | 2002-072234 A | 3/2002 |
| JP | 2003-092020 A | 3/2003 |
| JP | 2003-330377 A | 11/2003 |
| JP | 2004-079488 A | 3/2004 |

OTHER PUBLICATIONS

Official communication issued in the International Application No. PCT/JP2006/308635, mailed on Aug. 1, 2006.

* cited by examiner

*Primary Examiner*—Y My Quach Lee
(74) *Attorney, Agent, or Firm*—Keating & Bennett, LLP

(57) ABSTRACT

A display includes a display panel, a light guide plate arranged on the back side of the display panel, an LED arranged in the vicinity of the side surface of the light guide plate, a circuit board arranged on the back side of the light guide plate, and a plurality of TABs connecting the display panel and the circuit board. The LEDs are arranged between the plurality of TABs in the plan view, and the TAB is arranged to overlap the LED in the side view. In order to achieve uniform illumination with no unevenness in luminance, the TAB and the spot light source are preferably arranged alternately.

7 Claims, 6 Drawing Sheets

DISPLAY

BACKGROUND OF THE INVENTION

1. Field of the Invention

The present invention relates to a display device including a backlight, and more specifically to a display device including a backlight of a side light type or a combined type of a side light type and a downlight type.

2. Description of the Related Art

In a non-self-emitting display device such as a liquid crystal display, a so-called backlight is typically arranged so as to illuminate a display panel from the back surface. Examples of this backlight include: a downlight type, a side light type, and a planar light source type, and the like. Those of the side light type have been widely adopted, following trends toward slimming down and weight saving of the display.

The backlight of this side light type causes light from a light source to be incident on the side surface of a light guide plate, makes the light travel in the light guide plate by totally reflecting it while causing part of the light to be reflected on a reflection sheet fitted to the back surface of the light guide plate, and then emanates this part of light as a planar light source from the main surface to irradiate the back surface of the display panel. A cold-cathode tube has been used as a light source so far, but, in response to growing environmental awareness in recent years, a light emitting diode (LED) has been increasingly used.

FIG. 7 shows a conventional example of a backlight-equipped liquid crystal display device using an LED. FIG. 7 is a vertical sectional view of the liquid crystal display device. The liquid crystal display device (display device) of FIG. 7 includes a backlight 2 and a liquid crystal panel 1. In the backlight 2, to a lower chassis 21b of a rectangular parallelepiped shape with opening top and bottom sides, a back plate metal 26 is fitted so as to cover the bottom opening, and on the back plate metal 26, a light guide plate 22 of a rectangular parallelepiped shape is fitted. On the back surface of the light guide plate 22, a reflection sheet 24 is fitted, and to the front surface of the light guide plate 22, three optical sheets 25 are fitted. On the inner side wall of the lower chassis 21b opposing the side surface of the light guide plate 22, a plurality of LEDs (second light source) 23 are disposed. Then an upper chassis 21a formed with an opening that permits passage of light emanating from the light guide plate 22 therethrough is so fitted as to cover the top opening of the lower chassis 21b. By the upper chassis 21a and the lower chassis 21b, the back plate metal 26, the reflection plate 24, the light guide plate 22, and the optical sheets 25 are sandwiched.

On the other hand, the liquid crystal panel 1 is formed by enclosing a liquid crystal (not shown) between a pair of opposing glass substrates 11 and 12 separated from each other. The outer edge part of the glass substrate 12 extends farther outwardly than the glass substrate 11. Formed at this extending portion are a large number of electrode terminals (not shown) for applying a voltage to pixel electrodes formed on the front surface of the glass substrate 12. To the front and back surfaces of the liquid crystal panel 1, deflection plates 13a and 13b are fitted. The electrode terminals formed on the glass substrate 12 are connected, by a TAB (Tape Automated Bonding, flexible printed board) 3 fitted with an IC driver 31, to a circuit board 4 fitted on the back surface of the lower chassis 21b.

Then the liquid crystal display is provided by mounting a peripheral edge part of the liquid crystal panel 1 on a step part 28 formed at a peripheral edge of the opening part of the upper chassis 21a of the backlight 2, putting a bezel 5 thereon, and fixing together the bezel 5 and the upper chassis 21a to thereby couple the liquid crystal panel 1 to the backlight 2.

In a liquid crystal display device with such a configuration, the LED 23 is fitted near the side surface of the light guide plate 22 and the TAB 3 is fitted so as to extend around the outer side of the LED 23. As a result, a surrounding part of the light guide plate 22 is larger outwardly, thus resulting in a wide frame portion of the liquid crystal display device.

Thus, to narrow down the frame portion of the liquid crystal display device, for example, JP-A-H08-248420 suggests directly arranging an LED on one of the glass substrates forming a liquid crystal panel. JP-A-2003-92020 suggests creating a hole in a FPC (Flexible Printed Circuit) connecting together a liquid crystal panel and a circuit board and then projecting an LED from this hole toward the side surface of a light guide plate.

However, the former method requires machining the glass substrate into a special shape, and also requires directly fitting the LED to the glass substrate, which are technically difficult. Further, the former method faces a problem of low efficiency of light incidence from the LED to the glass substrate. The latter method results in a large FPC width and also complicated wiring, thus presenting a problem of increased FPC manufacturing costs.

SUMMARY OF THE INVENTION

In order to overcome such conventional problems, preferred embodiments of the present invention achieve downsizing of a display device by narrowing down a frame width of the device without using a special glass substrate or FPC while maintaining a display area.

A display device according to a preferred embodiment of the present invention preferably includes: a display panel; a light guide plate which is arranged on a back side of the display panel and which emanates, from a surface thereof on a display panel side, light incident from a side surface thereof to irradiate a back surface of the display panel; a second light source arranged near the side surface of the light guide plate; a circuit board arranged on a back side of the light guide plate; and a plurality of flexible printed boards connecting together the display panel and the circuit board. In the display device, the second light source is arranged between the plurality of flexible printed boards in a plan view, and the flexible printed board is arranged to overlap the second light source in a side view.

A display device according to another preferred embodiment of the present invention includes: a display panel; a housing with a top opening arranged on a back side of the display panel; a light scattering plate arranged so as to enclose the top opening of the housing; a first light source arranged at an inner bottom portion of the housing; a second light source arranged at an inner side portion of the housing; a circuit board arranged on a back side of the housing; and a plurality of flexible printed boards connecting together the display panel and the circuit board. In the display device, the second light source is arranged between the plurality of flexible printed boards in a plan view, and the flexible printed board is arranged to overlap the second light source in a side view.

From the view point of attaining uniform lamination with no unevenness in luminance, it is preferable that the printed board and the second light source be arranged alternately.

Moreover, it is preferable that a linear light source be provided as the first light source and a spot light source be provided as the second light source.

In the display device according to a preferred embodiment of the present invention, in a plan view, the second light source is arranged between the plurality of flexible printed boards, and in a side view, the flexible printed board is arranged to overlap the second light source. Thus, this permits a narrower frame width of the display device than that of a conventional one. Consequently, downsizing of the device can be achieved while maintaining the display area. Moreover, neither special transparent substrate nor FPC is used, thus not leading to an increase in the manufacturing costs.

The alternate arrangement of the printed board and the second light source permits uniform illumination with no unevenness in luminance.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, a display device according to preferred embodiments of the present invention will be described with reference to the accompanying drawings, although the present invention is not at all limited to these preferred embodiments.

Figure 1:
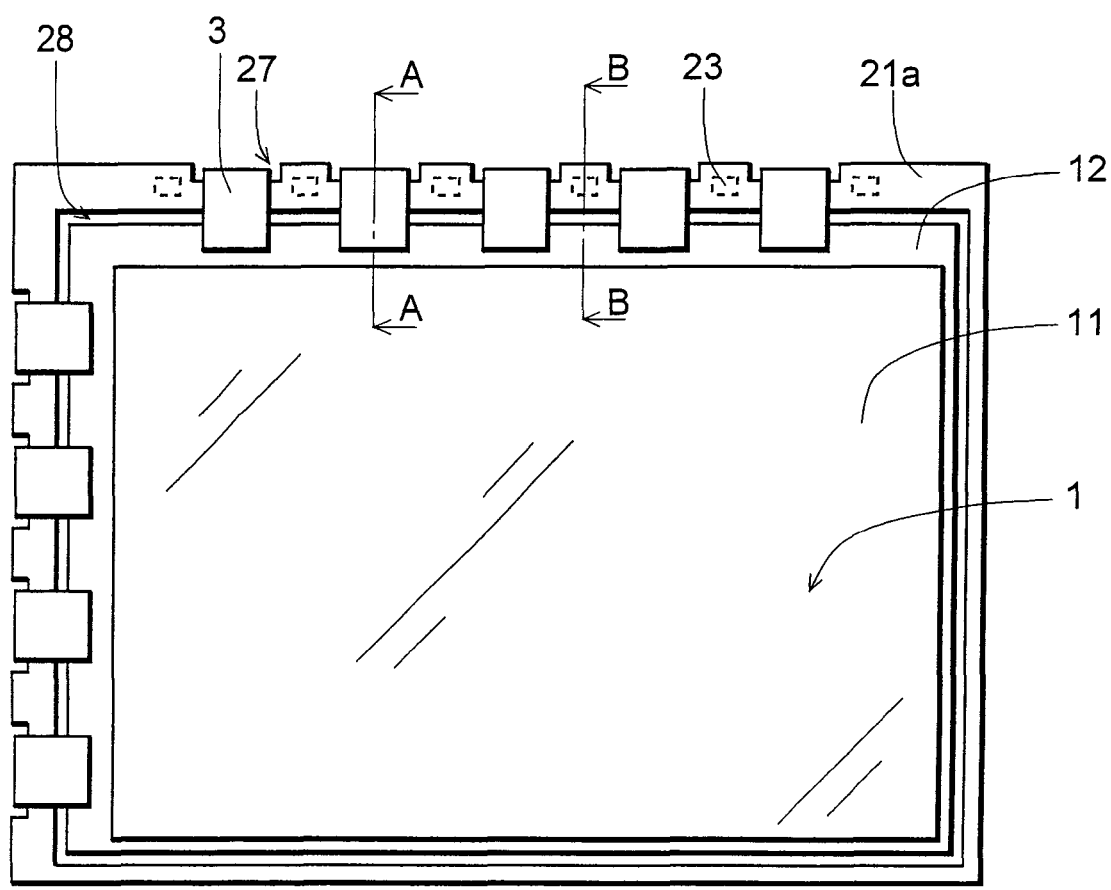
FIG. 1 is a plan view showing one example of a display device according to a preferred embodiment of the present invention.
Figure 2:
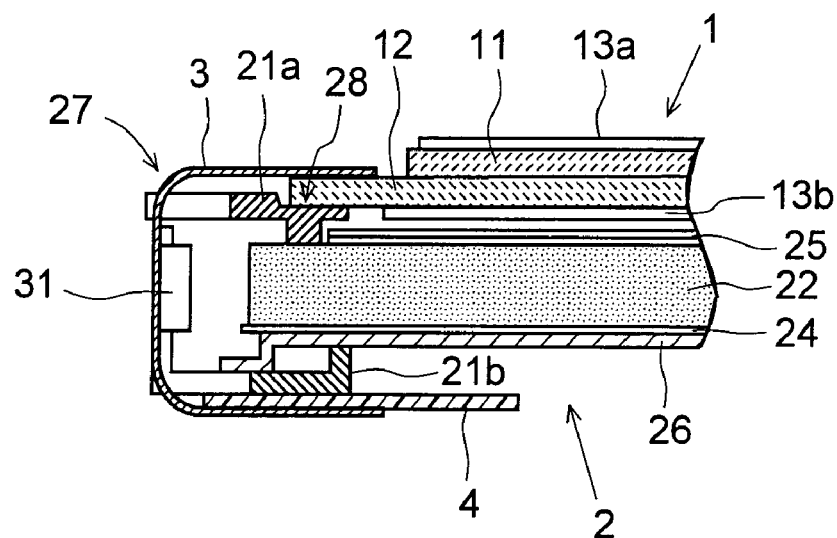
FIG. 2 is a sectional view taken along line A-A of FIG. 1.
Figure 3:
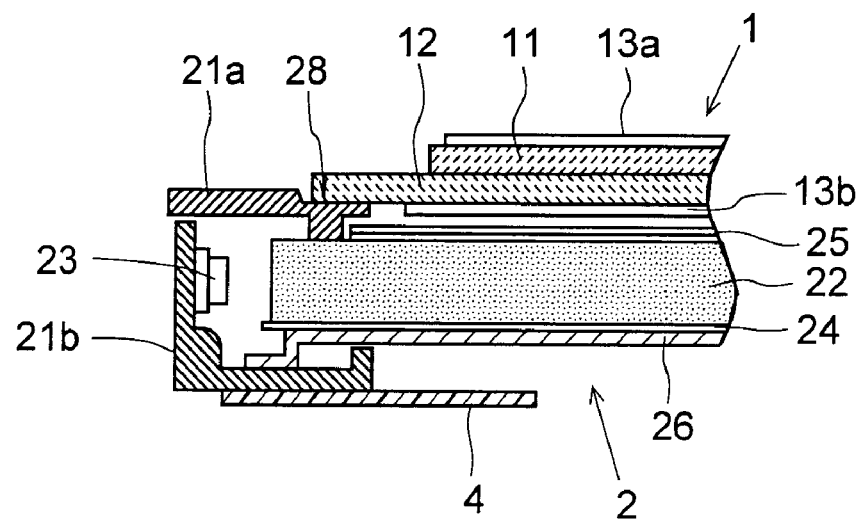
FIG. 3 is a sectional view taken along line B-B of FIG. 1.
Figure 7:
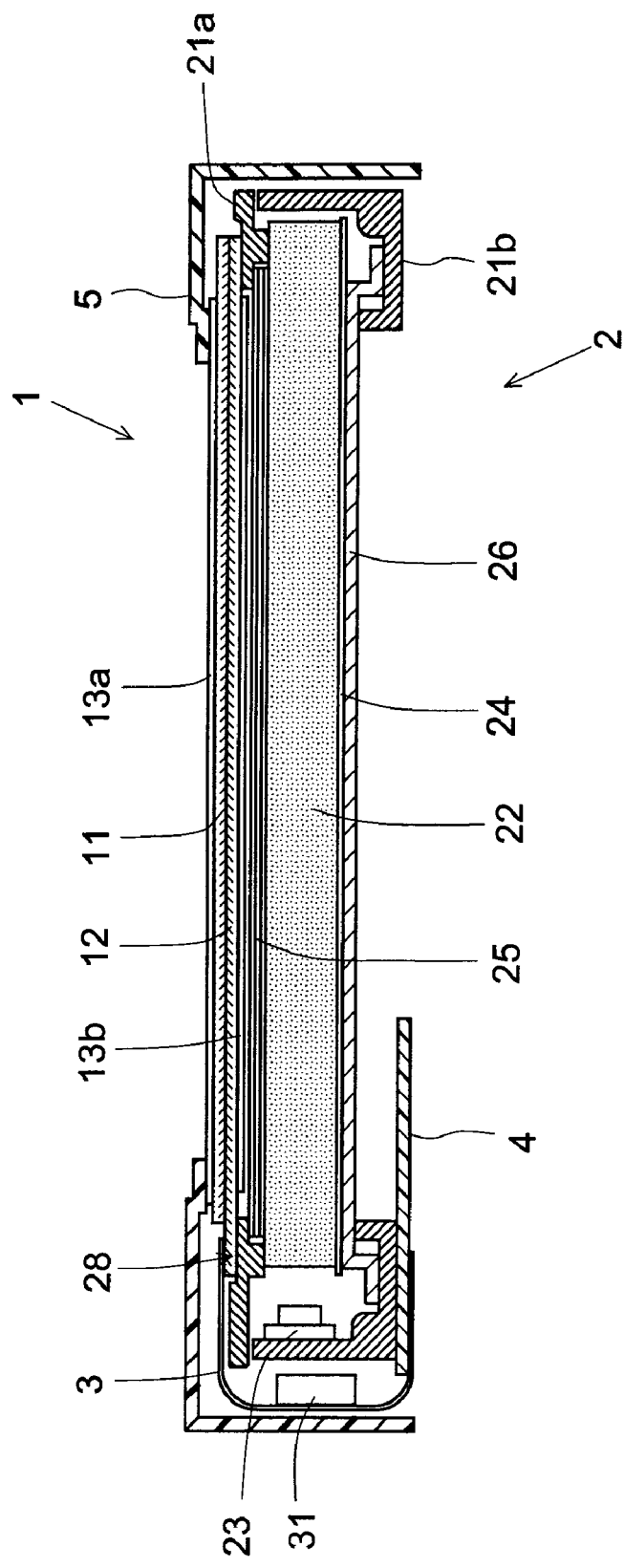
FIG. 7 is a vertical sectional view of a conventional liquid crystal display device.
Figure 8:
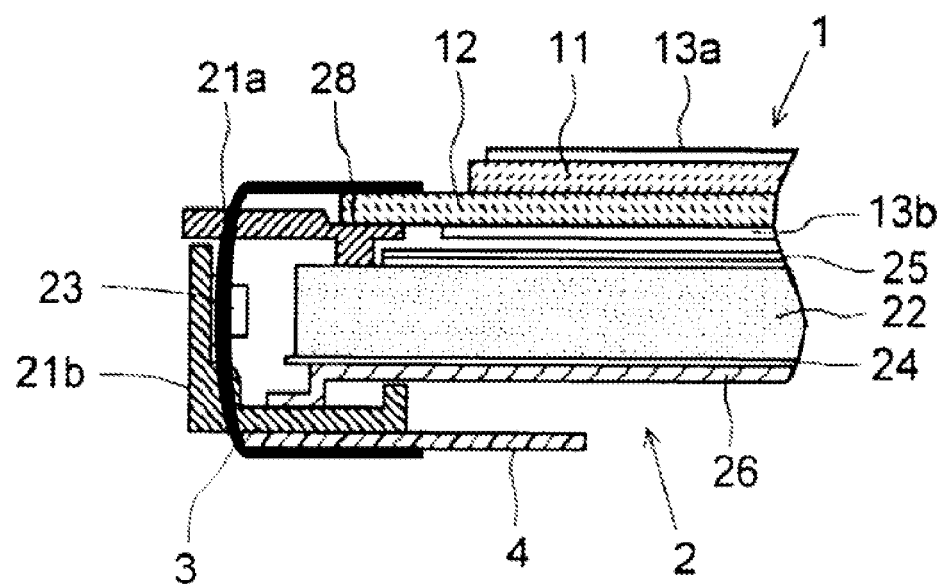
FIG. 8 is a sectional view of another example of the liquid crystal display device according to a preferred embodiment of the present invention.

FIG. 1 shows a plan view showing one example of the display device according to a preferred embodiment of the present invention. FIG. 2 shows a sectional view taken along line A-A of FIG. 1. FIG. 3 shows a sectional view taken along line B-B. Portions the same as those in FIG. 7 are provided with the same numerals and omitted from the description here. FIG. 1 is a plan view of the liquid crystal display device (display device) with a bezel removed. At one of the long and short sides of an upper chassis 21a, notches 27 are formed at predetermined intervals. Then on a step part 28 formed at the peripheral edge of an opening of the upper chassis 21a, a liquid crystal panel 1 is mounted. As can be understood from FIG. 2, a TAB 3 connected to an electrode terminal (not shown) formed on a glass substrate 12 is connected, through this notch 27 and extending around the side surface of a backlight 2, to a circuit board 4 fitted on the back surface of a lower chassis 21b. This locates the TAB 3 inward of the side surfaces of the upper chassis 21a and the lower chassis 21b.

On the other hand, an LED (second light source) 23 is fitted on the inner side wall of the lower chassis 21b as shown in FIG. 3, and is fitted between the TABs 3 as shown in FIG. 1. Consequently, unlike the case with a conventional device, the TAB 3 does not extend around the outer side of the LED 23, and thus the TAB 3 is located to overlap the LED 23 in a side view. This permits a shorter distance between a light guide plate 22 and the TAB 3 than is achieved conventionally.

The fitting position of the LED 23 is not specifically limited as long as it is between the TABs 3. In the device of FIG. 1, the LEDs 23 preferably are fitted near only one side surface of the light guide plate 22, but the LEDs 23 may be fitted near two or more side surfaces of the light guide plate 22. However, in terms of downsizing and weight saving of the display device, it is preferable that the LEDs 23 be fitted near one side surface of the light guide plate 22. In the device of FIG. 1, one LED 23 is arranged between the TABs 3, but two or more LEDs 23 may be arranged therebetween. In this condition, the LEDs 23 may be arranged in two stages in the thickness direction of the light guide plate 22. To reduce unevenness in luminance of light emanated from the light guide plate 22, it is preferable that the TABs 3 and LEDs 23 as shown in FIG. 1 are arranged alternately.

Figure 4:
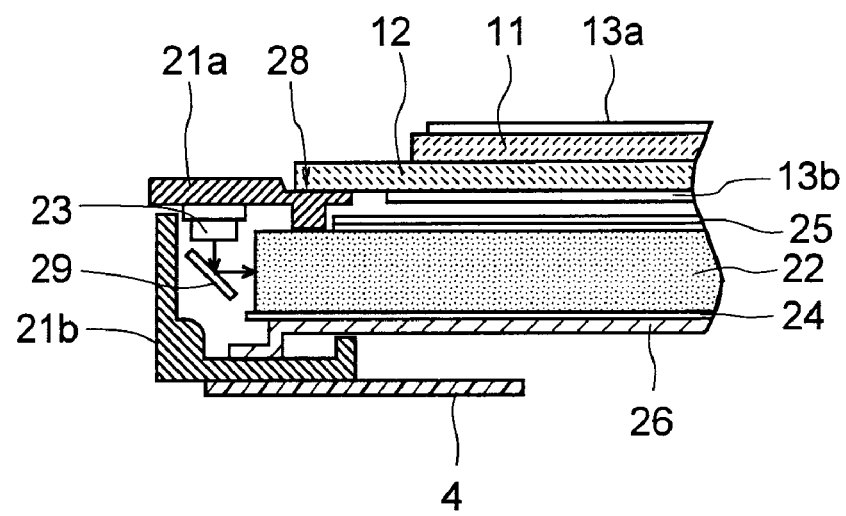
FIG. 4 is a schematic diagram showing another example of the liquid crystal display device according to a preferred embodiment of the present invention.

Moreover, in the device of FIG. 1, the LED 23 is preferably fitted on the inner side wall of the lower chassis 21b. However, the LED 23 is only required to be arranged near the side surface of the light guide plate 22. For example, as shown in FIG. 4, the LED 23 may be arranged above (or below) the side surface of the light guide plate 22 so that light from the LED 23 may be made incident on the side surface of the light guide plate 22 by a reflection plate 29. Such structure slightly increases the thickness of the display device but can further narrow down the frame width.

As a flexible printed board for use in preferred embodiments of the present invention, instead of the TAB, an FPC may be used. Moreover, the second light source for use in preferred embodiments of the present invention is not limited to the LED, and thus any of those conventionally known light source can be used as long as it can be arranged between the flexible printed boards. However, in terms of size, luminance, and the like, the LED is preferable.

Next, an assembly method for the liquid crystal display device of FIG. 1 will be described. First, starting with the assembly of the backlight 2, referring to FIGS. 2 and 3, in the lower chassis 21b on one inner side wall of which the LEDs 23 are loaded, a back plate metal 26 and the light guide plate 22 on the back surface of which a reflection sheet 24 is fitted are mounted in this order. This locates the LED 23 near the side surface of the light guide plate 22. Next, on the front surface of the light guide plate 22, a plurality of optical sheets 25 are mounted. Then on the optical sheets 25, the upper chassis 21a is mounted, and the upper chassis 21a and the lower chassis 21b are brought into engagement with each other. As a result, the outer edge portions of the optical sheets 25 are pressed by the upper chassis 21a, whereby the back plate metal 26, the reflection sheet 24, the light guide plate 22, and the optical sheets 25 are sandwiched by the upper chassis 21a and the lower chassis 21b.

On the other hand, to electrode terminals (not shown) formed at an extending portion of the glass substrate 12 of the liquid crystal panel 1, first ends of the TABs 3 and the FPCs are each connected. Then the second ends of the TABs 3 and the FPCs are each connected to the circuit board 4. To the front and back surfaces of the liquid crystal panel 1, deflection plates 13a and 13b are respectively attached. The deflection plates 13a and 13b preferably have outer dimensions that are a little smaller than those of the glass substrates 11 and 12, considering tolerance for attachment. The liquid crystal panel 1 formed in this manner is mounted on the step part 28 of the upper chassis 21a of the backlight 2, the TAB 3 and the FPC are bent, and then the circuit board 4 is fitted on the back surface of the lower chassis 21*b*. When the TAB 3 and the FPC are bent, they enter into the notch 27 of the upper chassis 21*a*. This state is shown in states of FIGS. 1 to 3. The connection of the TAB 3 and the FPC with the circuit board 4 may be achieved by fitting the circuit board 4 on the lower chassis 21*b*, and subsequently bending the TAB 3 and the FPC, and then connecting them to the circuit board 4. Next, a bezel 5 is put on from the front side of the upper chassis 21*a*, and the upper chassis 21*a* or the lower chassis 21*b* is brought into engagement with the bezel 5 to fix the bezel 5. The bezel 5 presses the outer edge portion of the liquid crystal panel 1, whereby the liquid crystal panel 1 is fixed to the front side of the backlight 2, thereby completing the liquid crystal display device.

Figure 5:
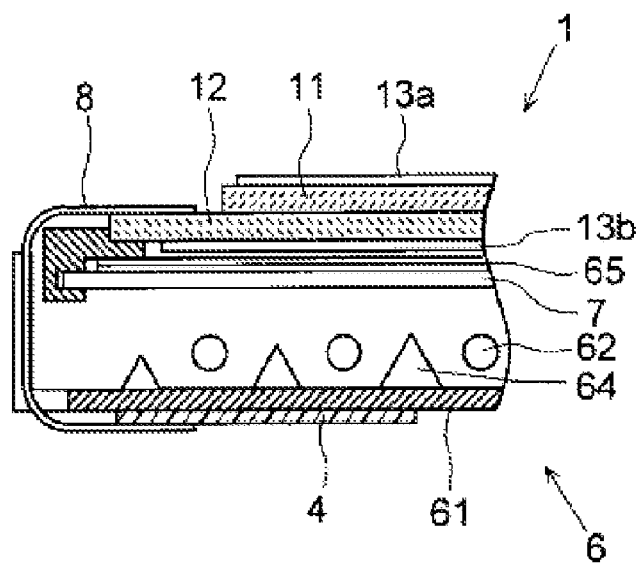
FIG. 5 is a sectional view at a FPC portion showing an example of a display device according to another preferred embodiment of the present invention.
Figure 6:
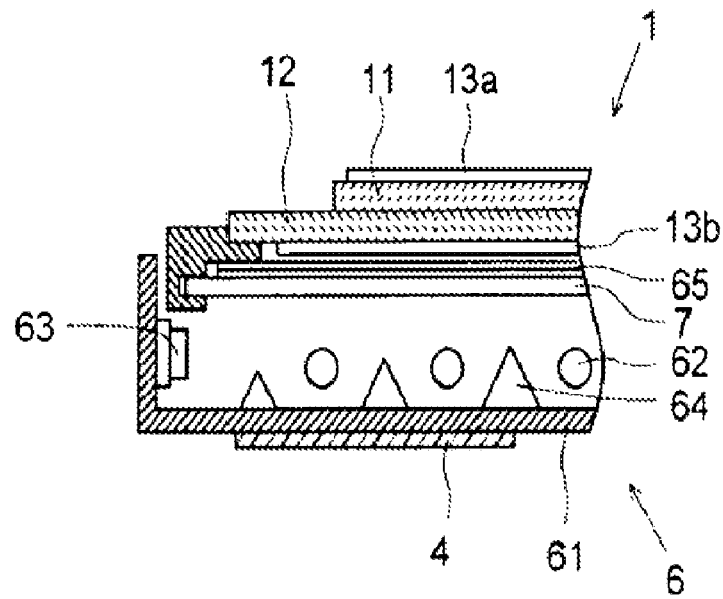
FIG. 6 is a sectional view at an LED portion.

Next, a display device according to another preferred embodiment of the present invention will be described. A plan view of the display device according to this preferred embodiment of the present invention preferably is substantially identical to that of FIG. 1. FIG. 5 is a vertical sectional view at a portion where an FPC (flexible printed board) 8 is disposed. FIG. 6 is a vertical sectional view at a portion where an LED 63 is disposed. A backlight 6 of the liquid crystal display device in these figures is of a type combining together a down light type and a side light type. At an inner bottom portion of a housing 61 that has a substantially rectangular-parallelepiped shape with a top opening, a plurality of cold-cathode tubes (first light source) 62 are arranged in a row so as to face the top opening, and on the inner bottom surface of the housing 61, a plurality of reflection elements 64 having a projection cross-sectionally triangular shape are arranged at predetermined intervals. The entire inner surface of the housing acts to reflect light. On the other hand, as shown in FIG. 6, on the inner side surface of the housing 61, an LED (second light source) 63 is disposed. A scattering plate (light scattering member) 7 is so arranged as to enclose the top opening, and on the scattering plate 7, a plurality of optical sheets 65 are fitted.

Light emanated from the cold-cathode tube 62 is made incident, directly or by being reflected on the bottom surface or reflection element 64 of the housing 61, on the light scattering plate 7, and is irradiated to the back surface of a liquid crystal panel while turning into planar light. On the other hand, light emanated from the LED 63, similarly to the cold-cathode tube 62, is also made incident, directly or by being reflected on the bottom surface or reflection element 64 of the housing 61, on the light scattering plate 7, and is irradiated to the back surface of the liquid crystal panel 1 while turning into planar light. The use of these two light sources permits this display device to provide a remarkably brighter display than a conventional display device.

In the display device of this preferred embodiment, the electrode terminals (not shown) formed on the glass substrate 12 of the liquid crystal panel 1 are connected to first ends of a plurality of FPCs 8, the second ends of which are connected to the circuit board 4 fitted on the back surface of the housing 6. Then the LED 63, similarly to the preferred embodiment described above, is arranged between the FPCs 8 in a plan view. As a result, the FPC 8 does not extend around the outer side of the LED 63, and thus the FPC 8 can be located to overlap the LED 63 in a side view. This permits a narrower frame width of the display device than that of a conventional one.

The display device according to preferred embodiments of the present invention can be downsized and slimmed down, and thus can be favorably used in a compact electronic device, such as a portable phone, a liquid crystal television, a car navigation, or the like, which has limited installation space.

A display device according to preferred embodiments of the present invention can be downsized by narrowing down a frame width of the display device without using a special glass substrate or FPC while maintaining a display area.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
   a display panel;
   a light guide plate arranged on a back side of the display panel, the light guide plate being arranged to emanate, from a surface thereof on a display panel side, light incident from a side surface thereof to irradiate a back surface of the display panel;
   a light source arranged near the side surface of the light guide plate;
   a circuit board arranged on a back side of the light guide plate; and
   a plurality of flexible printed boards arranged to connect the display panel and the circuit board together; wherein
   the light source is arranged between the plurality of flexible printed boards in a plan view, and at least one of the plurality of flexible printed boards is arranged to overlap the light source in a side view.

2. The display device according to claim 1, wherein the plurality of flexible printed boards and a plurality of light sources are arranged alternately in a plan view.

3. The display device according to claim 1, wherein the light source is a spot light source.

4. A display device comprising:
   a display panel;
   a housing with a top opening, the housing being arranged on a back side of the display panel;
   a light scattering plate arranged so as to enclose the top opening of the housing;
   a first light source arranged at an inner bottom portion of the housing;
   a second light source arranged at an inner side portion of the housing;
   a circuit board arranged on a back side of the housing; and
   a plurality of flexible printed boards arranged to connect the display panel and the circuit board together; wherein
   the second light source is arranged between the plurality of flexible printed boards in a plan view, and at least one of the plurality of flexible printed boards and the second light source are arranged so as to overlap each other in a side view.

5. The display device according to claim 4, wherein the plurality of the flexible printed board and a plurality of the second light sources are arranged alternately in a plan view.

6. The display device according to claim 4, wherein the second light source is a spot light source.

7. The display device according to claim 4, wherein the first light source is a linear light source.

* * * * *